No. 722,762. PATENTED MAR. 17, 1903.
J. P. SCHUCH, Jr.
PROCESS OF SEPARATING PRECIOUS METALS FROM SOLVENT SOLUTIONS.
APPLICATION FILED MAY 21, 1902.
NO MODEL.
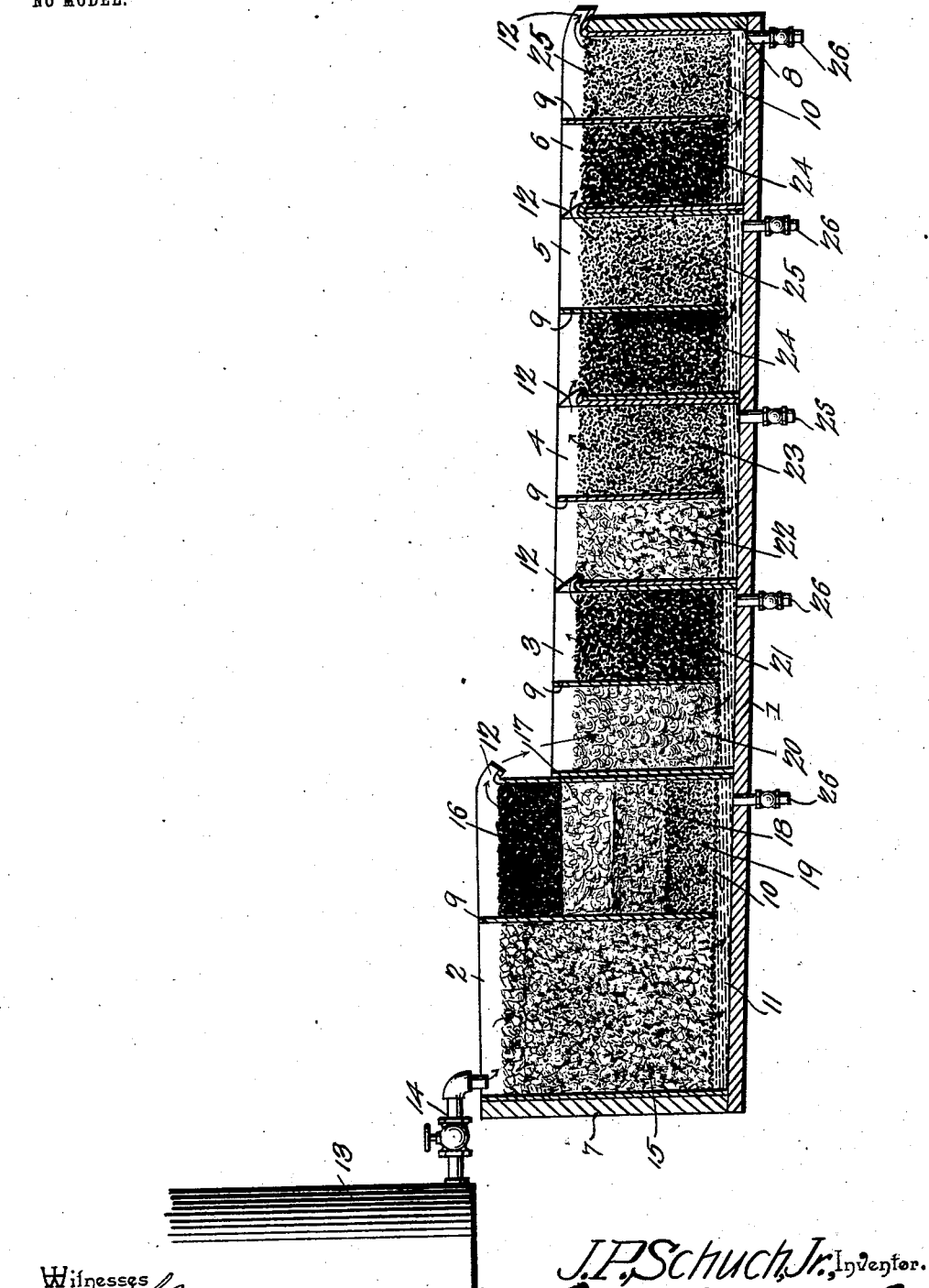

UNITED STATES PATENT OFFICE.

JOHN PHILIP SCHUCH, JR., OF CRIPPLECREEK, COLORADO.

PROCESS OF SEPARATING PRECIOUS METALS FROM SOLVENT SOLUTIONS.

SPECIFICATION forming part of Letters Patent No. 722,762, dated March 17, 1903.

Application filed May 21, 1902. Serial No. 108,427. (No specimens.)

*To all whom it may concern:*

Be it known that I, JOHN PHILIP SCHUCH, Jr., a citizen of the United States, residing at Cripplecreek, in the county of Teller and State of Colorado, have invented a new and useful Process of Separating Precious Metals from Solvent Solutions, of which the following is a specification.

This invention relates to a process of separating precious metals from their solvent solutions.

The object of the invention is in a rapid, inexpensive, simple, and practical manner to recover precious metals from the solutions containing them and at the same time effect filtration of the solutions.

The present invention refers to the treatment of cyanid solutions for the purpose above defined, and more particularly to the treatment of warm potassium-cyanid solutions, and differs from the usual procedures heretofore practiced in the initial treatment of the solution. The procedure generally followed is to pass the solution directly through a mass of carbon, thence through finely-divided zinc, thence again through carbon, and so on, the carbon acting as a precipitating agent and also to catch and retain the bulk of the precious metals and also to effect filtration of the solution, and the zinc operating to precipitate and retain a further percentage of the precious metals that have escaped retention by the carbon. Under the procedure observed in the present process the solution is initially subjected to a treatment which effects neutralization of any free acids contained therein and also any compounds formed during the neutralization of the acids, after which it is subjected to the action of a precipitant, such as zinc, then to a filtering agent, such as charcoal or coke, then to a zinc-precipitating agent, which will operate to remove the bulk of the zinc contained in the solution, and then alternately to the action of a precipitant and a filtering agent, the last step of the procedure being the passage of the solution through a precipitant. Under the steps defined not only are all of the precious metals removed from the solution, but the solution itself is divested of all foreign substances in the nature of slime, partially decomposed zinc, and the like and is thus presented in shape for reuse, effecting thereby a large saving in the process.

With the above and other objects in view, as will appear as the nature of the invention is better understood, the same consists in a process of separating precious metals from their solvent solutions and in filtering the solutions, as will be hereinafter fully described and claimed.

In the accompanying drawing, forming a part of this specification, and in which like numerals of reference indicate corresponding parts, there is illustrated one form of apparatus capable of carrying the process into operation, it being understood that the invention is not to be limited to the form of apparatus herein shown, as various other arrangements may be employed for the same purpose, and in this drawing the figure is a view in longitudinal section of a separating apparatus for carrying out the hereinafter-described process.

Referring to the drawing, 1 designates a tank or vat divided into a plurality of removable communicating compartments or separating-chambers 2, 3, 4, 5, and 6. The tank may be constructed of any material best suited to the purpose and is provided with an inclined bottom, the head end 7 of the tank being higher than the tail end 8. Each of the separating-chambers is a box-like structure having a central partition 9, dividing the chamber into two compartments, and a reticulated bottom 10, disposed some distance above the lower edges of the chambers to present passage-ways 11 for the solutions, the partitions 9 terminating with the bottom 10 in order that the solution may pass from one compartment of a chamber upward into the other compartment thereof, as indicated by arrows in the drawing, and the forward end of each compartment is provided with a centrally-disposed spout 12, which projects over the adjacent wall of the next chamber, thus to permit passage of the solution from chamber to chamber up to the point of discharge.

Disposed adjacent the first compartment of the chamber 2 is a vat or reservoir 13, containing the solution, a valve-controlled discharge-pipe 14 operating to direct the flow of solution to the said compartment.

The first compartment of the chamber 2 contains crushed limestone or phonolite 15, and the second compartment contains superposed layers of neutralizing and filtering agents, consisting in this instance of charcoal or coke, (designated by 16,) asbestos wool, (designated by 17,) coarse wood-ashes, (designated by 18,) and finely-divided zinc, (designated by 19.) It is to be understood that the invention is not to be limited to the order of arrangement of materials named, as they may be changed or transposed, if found necessary or desirable, and still be within the scope of the invention. The first compartment of the chamber 3 contains zinc shavings (designated by 20) and the second compartment crushed charcoal or coke, (designated by 21.) The first compartment of the chamber 4 contains a zinc-precipitating agent, such as limestone or crushed phonolite, (designated by 22,) and the second compartment reduced zinc, (designated by 23.) The remaining chambers 5 and 6 contain, respectively, in the first compartment of each crushed charcoal or coke (designated by 24) and in the second compartment reduced zinc, (designated by 25.)

The bottom of the tank is provided with valve-controlled draw-off pipes 26, communicating with the last compartment of each of the chambers, through which slime and the like may be removed from the tank.

In the practical operation of the process the warm potassium-cyanid solution enters the first compartment of the chamber 2 and passes down through the limestone or phonolite, which operates to neutralize any free acids contained in the solution, and thence passes upward from the bottom of the second compartment through the superposed strata of zinc, wood-ashes, asbestos wool, and charcoal or coke. The successive treatments to which the solution is subjected in this compartment operate to remove a part of the precious metals and also compounds formed during the neutralization of the acids. The solution now passes to the first compartment of the chamber 3, containing zinc shavings, which latter operate to precipitate and retain a further percentage of the precious metals contained in the solution, and from the bottom of this compartment the solution passes upward through the second chamber, containing charcoal or coke, where a further percentage of the precious metals are retained and a second filtration of the solution ensues. The solution then passes to the first compartment of the chamber 4, where it is subjected to the action of the limestone or crushed phonolite, which operates by combining with the zinc in the solution to free the latter therefrom, and the solution then passes upward through the second compartment of the chamber 4, containing zinc, which effects a further precipitation of the precious metals, and thence through the chambers 5 and 6, where it is alternately subjected to the action of the charcoal or coke and zinc up to the point of discharge. When the solution escapes from the second compartment of the chamber 6, it will be in condition for reuse, and practically all trace of the precious metals will have disappeared therefrom. To separate the precious metals from the different agents to which they have been subjected, the boxes will be removed from the tank and their contents subjected to the usual treatment.

It is to be understood that the invention is not to be limited to subjecting the solution to the action of limestone or phonolite but once after it leaves the chamber 2, as additional chambers may be added to the system to contain these substances, or one or more of the chambers containing charcoal or coke and zinc may be utilized for this purpose; also, that in lieu of the asbestos wool in the second compartment of chamber 2 crushed fibrous bark may be employed and still be within the scope of the invention.

It will be seen from the foregoing description that the procedure herein defined is rapid and continuous and will be thoroughly effective in performing the functions designed.

Having thus fully described my invention, what I claim as new, and desire to secure by Letters Patent, is—

1. A step in the process of separating precious metals from their solvent solutions, which consists first in neutralizing any free acid contained in the solution, and then any compound formed during the neutralization of the acids.

2. The process of separating precious metals from their solvent solutions, which consists in neutralizing any free acid and compounds formed during the neutralization of the acids, then subjecting the solution to the action of precipitants, filtering and zinc-precipitating agents.

3. The process of separating precious metals from their solvent solutions, which consists in neutralizing any contained acid and any free soda or carbonates, then subjecting the solution to a precipitant, then to a filtering agent, then precipitating any zinc held in the solution, and then subjecting the solution alternately to the action of a precipitant and a filtering agent.

4. The process of separating precious metals from their solvent solutions, which consists first in passing the solution through crushed limestone or phonolite to neutralize any free acid, then through zinc, wood-ashes, asbestos wool or its equivalent, and charcoal or coke to neutralize any free soda or carbonates, then through zinc shavings to precipitate the precious metals, then through charcoal to filter the solution and effect retention of a percentage of the precious metals, then through limestone or crushed phonolite to effect precipitation of zinc contained in the solution, and then alternately through zinc, charcoal or coke and zinc to effect complete separation of the precious metals and thorough filtration of the solution.

In testimony that I claim the foregoing as my own I have hereto affixed my signature in the presence of two witnesses.

JOHN PHILIP SCHUCH, JR.

Witnesses:
R. M. ELLIOTT,
J. H. JOCHUM, Jr.